United States Patent [19]
Reil et al.

[11] Patent Number: 6,111,029
[45] Date of Patent: Aug. 29, 2000

[54] POLYACETAL MOLDINGS WITH DIRECTLY MOLDED-ON FUNCTION ELEMENTS

[76] Inventors: Frank Reil; Frank Reuter; Ulrich Haack; Gerhard Reuschel, all of Hoechst Aktiengesellschaft, D-65926 Frankfurt am Main, Germany

[21] Appl. No.: 09/298,547

[22] Filed: Apr. 23, 1999

Related U.S. Application Data

[62] Division of application No. 08/552,427, Nov. 3, 1995, Pat. No. 5,977,266.

[30] Foreign Application Priority Data

Nov. 7, 1994 [DE] Germany .............................. 44 39 766

[51] Int. Cl.$^7$ ........................... C08L 59/00; B29C 45/16; B29C 47/06
[52] U.S. Cl. ......................... 525/402; 525/398; 525/474; 428/500; 428/501; 428/524
[58] Field of Search .................................. 525/402, 398, 525/474; 428/500, 501, 524

[56] References Cited

U.S. PATENT DOCUMENTS

| | | |
|---|---|---|
| 3,674,891 | 7/1972 | Wheeler . |
| 3,955,697 | 5/1976 | Valyi . |
| 4,214,034 | 7/1980 | Kodera ..................................... 428/315 |
| 5,039,741 | 8/1991 | Burg et al. . |
| 5,047,471 | 9/1991 | Burg et al. . |
| 5,098,787 | 3/1992 | Komatsu ................................ 428/343 |
| 5,135,475 | 8/1992 | Nakanishi ................................ 604/14 |
| 5,190,828 | 3/1993 | Katsumata . |
| 5,251,953 | 10/1993 | Willey ...................................... 296/152 |
| 5,256,739 | 10/1993 | Fleisher et al. . |
| 5,300,338 | 4/1994 | Byrd, Jr. ................................ 428/36.6 |

FOREIGN PATENT DOCUMENTS

| | | |
|---|---|---|
| 2 207 806 | 6/1974 | France . |
| 2 608 501 | 6/1988 | France . |
| 2 160 146 | 12/1985 | United Kingdom . |

OTHER PUBLICATIONS

Database WPI, Week 8923, Derwent Publications Ltd., London, GB; AN 89–169534 & JP-A-01 110 918 (Oshita Sangyo KK), Apr. 27, 1989, published in England and entitled "Manufacture Of Assembled Molded Member".

Database WPI, Week 8849, Derwent Publications Ltd., London, GB; AN 88–351343 & JP-A-63 264 688 (Asahi Chemical Ind KK), Nov. 1, 1988 published in England entitled "Copolymer Adhesive For Laminates With Good Peel Resistance".

Database WPI, Week 8832, Derwent Publications Ltd., London, GB; AN 88–225604 & JP-A-63 162 210 (Hashimoto Forming Kogyo), Jul. 5, 1988, published in England entitled "Window Frame Production".

Patent Abstracts of Japan, vol. 13, No. 339, (C–624), Jul. 31, 1989 & JP-A-01 118533 (Asahi Chem Ind Co Ltd), May 11, 1989, published in Japan and entitled "Preparation of poly-acetal–rubber composition";

Database, WPI, Week 8905, Derwent Publications Ltd., London, GB; AN 89–034491 and JP-A-63 306 014 (Asahi Chemical Ind KK), Dec. 14, 1988 published in Japan and entitled "Doublel yer Insert Injection–Molded Items".

Patent Abstracts of Japan, vol. 13, No. 545 (M–902), Dec. 6, 1989 & JP-A-01 225523 (Hitachi Ltd), Sep. 8, 1989 published in Japan entitled "Injection Molded Product with Inserts".

Patent Abstracts of Japan vol. 14, No. 107 (M–0942), Feb. 27, 1990 & JP-A-01 310911 (N O K Meguarasuteitsuku KK), Dec. 15, 1989 published in Japan and entitled "Manufacture Of Centering Bushing"; and.

Database WPI, Week 9530, Derwent Publications Ltd., London, GB; and 95–227893 & JP-A-07 137 089 (Yamashita Denki KK), May 30, 1995, published in England and entitled "Injection Molding of Different Material Quality Resin Molded Products".

*Primary Examiner*—Fred Zitomer

[57] ABSTRACT

The novel molding made from a combination of polyacetal with directly molded-on function elements is distinguished by the fact that the function elements comprise one or more elastomers. Such elastomers comprise partially or fully hydrogenated nitrile rubbers, one- or multi-component silicone rubbers or sulfur-containing rubbers.

10 Claims, No Drawings

POLYACETAL MOLDINGS WITH DIRECTLY MOLDED-ON FUNCTION ELEMENTS

This is a divisional of prior application Ser. No. 08/552,427 filed Nov. 3, 1995, now U.S. Pat. No. 5,977,266.

The invention relates to moldings made from a combination of the engineering material polyacetal, in particular polyoxymethylene, with directly molded-on function elements made from one or more elastomers.

The engineering material polyacetal, in particular polyoxymethylene (POM), has excellent mechanical properties and in addition is also resistant to all customary solvents and fuels. Moldings made from polyoxymethylene are therefore frequently used in fuel-conveying systems. Owing to its very good resistance to chemicals, housings are also made from polyoxymethylene. However, POM has a low mechanical damping factor, which makes the use of flexible damping elements necessary in some applications. Furthermore, a seal is frequently necessary at joints when polyoxymethylene moldings are installed. The high surface hardness of POM moldings and the low coefficient of sliding friction of POM can result in slipping of articles lying on top and restriction of the operating security of switches and controls made from POM.

Hitherto, seals and damping elements have been provided separately and usually anchored mechanically in an additional step, which causes additional work and in some cases considerable additional costs.

The object of the present invention was to provide a polyacetal molding with directly molded-on function elements, in which the adhesion between the molding as such and the function elements is improved without additional adhesive layers or mechanical anchoring being necessary.

This object is achieved by a molding of the above type wherein the directly molded-on function elements comprise elastomers which comprise partially or fully hydrogenated nitrile rubbers, styrenebufadiene copolymers one- or multicomponent silicone rubbers or sulfur-containing rubbers.

A nitrile rubber which has proven particularly suitable for the purposes of the present invention is acrylonitrile-butadiene copolymer. It was surprising that said rubbers have very good adhesion to the polyoxymethylene of the moldings. For the purposes of the present invention, the term "function elements" is taken to mean, for example, sealing and/or damping elements or alternatively regions for improving the grip, such as recessed grips and the like.

For the purposes of the present invention, the term "directly molded-on" is taken to mean that the function elements are preferably produced together with the POM moldings to which they are to bond in a one-step process, for example in a multicomponent injection-molding process or by coextrusion.

As a measure of the adhesive strength, the peel strength of two POM sheets with a width of 15 mm bonded by the elastomer is determined. In accordance with the invention, the peel strength between the molding and the directly molded-on function elements is at least 10 N, preferably at least 15 N.

The use of the abovementioned elastomers allows the sealing or damping elements to be molded directly onto POM moldings without further assembly steps being necessary. The elimination of the processing steps required hitherto for assembly of function elements allows considerable cost saving during production of the novel moldings and during their assembly.

Fields of application of the novel moldings are, for example, housings in automobile construction, such as door-lock housings, window-winder housings, sunroof sealing elements and the like, and fixing elements with good damping properties, for example clips or slip-proof controls, such as knobs or recessed grips on pens or switch levers.

What is claimed is:

1. An article of manufacture comprising a polyacetal molding, comprising a combination of polyacetal with directly molded-on function elements bonded thereto, wherein the function elements comprise regions which provide sealing, damping and gripping means to the molding, and having a housing, fixing element, or slip-proof control, wherein the function elements comprise one or more elastomers selected from the group consisting of partially or fully hydrogenated nitrile rubbers, one- or multicomponent silicone rubbers, sulfur-containing rubbers, acrylonitrile-butadiene copolymers, and styrene-butadiene copolymers, wherein the adhesion between the function elements and the polyacetal is maintained without adhesive layers or mechanical anchoring therebetween.

2. An article of manufacture according to claim 1 wherein the housing is a door-lock housing or a window winder housing.

3. An article of manufacture according to claim 1 wherein the fixing element is a clip.

4. An article of manufacture according to claim 1 wherein the slip-proof contril is a know, recessed grip on pens or switch lever.

5. An article of manufacture comprising a polyacetal molding, comprising a combination of polyacetal with directly molded-on function elements bonded thereto, wherein the function elements comprise regions which provide sealing, damping and gripping means to the molding, and having a housing, fixing element, or slip-proof control, wherein the function elements comprise one or more elastomers selected from the group consisting of acrylonitrilebutadiene copolymers, and styrene-butadiene copolymers, wherein the adhesion between the function elements and the polyacetal is maintained without adhesive layers or mechanical anchoring therebetween.

6. An article of manufacture according to claim 5 wherein the housing is a door-lock housing or a window winder housing.

7. An article of manufacture according to claim 5 wherein the fixing element is a clip.

8. An article of manufacture according to claim 5 wherein the slip-proof control is a knob, recessed grip on pens or switch lever.

9. An article of manufacture according to claim 1 wherein the polyacetal is polyoxymethylene.

10. An article of manufacture according to claim 5 wherein the polyacetal is polyoxymethylene.

* * * * *